United States Patent
Williams et al.

(10) Patent No.: US 8,589,927 B2
(45) Date of Patent: Nov. 19, 2013

(54) METHOD, APPARATUS AND TRACE MODULE FOR GENERATING TIMESTAMPS

(75) Inventors: Michael John Williams, Ely (GB); John Michael Horley, Cambridge (GB); Edmond John Simon Ashfield, Cambridge (GB)

(73) Assignee: ARM Limited (GB)

( * ) Notice: Subject to any disclaimer, the term of this patent is extended or adjusted under 35 U.S.C. 154(b) by 342 days.

(21) Appl. No.: 12/929,743

(22) Filed: Feb. 14, 2011

(65) Prior Publication Data

US 2011/0219376 A1 Sep. 8, 2011

(30) Foreign Application Priority Data

Mar. 3, 2010 (GB) .................................. 1003554.1

(51) Int. Cl.
G06F 9/46 (2006.01)

(52) U.S. Cl.
USPC .......................................... 718/100; 718/104

(58) Field of Classification Search
USPC ................................................ 718/100, 104
See application file for complete search history.

(56) References Cited

U.S. PATENT DOCUMENTS

| 7,461,159 | B2 * | 12/2008 | Tayyar et al. | 709/229 |
| 7,743,279 | B2 * | 6/2010 | Walker et al. | 714/30 |
| 7,984,338 | B2 * | 7/2011 | Walker et al. | 714/45 |
| 8,145,760 | B2 * | 3/2012 | Dinda et al. | 709/226 |
| 2002/0188831 | A1 | 12/2002 | Jackson et al. | |
| 2006/0212244 | A1 | 9/2006 | Levine et al. | |
| 2006/0255974 | A1 | 11/2006 | Swoboda | |
| 2007/0050773 | A1 * | 3/2007 | Tayyar et al. | 718/102 |
| 2008/0075015 | A1 * | 3/2008 | Lindvall et al. | 370/252 |
| 2008/0250275 | A1 * | 10/2008 | Walker et al. | 714/45 |
| 2009/0125756 | A1 | 5/2009 | Swaine et al. | |

OTHER PUBLICATIONS

Arm Limited, Coresight Program Flow Trace, Architecture Specification, v1.0, Apr. 9, 2008.
Search Report for UK1003554.1, dated Jun. 22, 2010.

* cited by examiner

*Primary Examiner* — Van Nguyen
(74) *Attorney, Agent, or Firm* — Nixon & Vanderhye P.C.

(57) ABSTRACT

A trace module generates timestamps while tracing characteristics of a data processing apparatus or processing is performed by the data processing apparatus. When a predetermined event occurs, a timestamp request flag is set to indicate that a timestamp request is pending. Upon generation of a following trace packet, it is determined whether the timestamp request flag indicates that a timestamp request is pending, and if a request is pending then a timestamp is generated corresponding to the following trace packet, and the timestamp request flag is set to indicate that there is no pending timestamp request.

33 Claims, 9 Drawing Sheets

| Time | Processor 4-1 | Processor 4-2 |
|---|---|---|
| 0 | T1, "He", TS=0 | |
| 100 | | |
| 200 | | |
| 300 | T1, "ll" | |
| 400 | | |
| 500 | | T2, "No", TS=500 |
| 600 | | T2, "w" |
| 700 | | T1, "o" |
| 800 | | T2, "is" |
| 900 | | T2, "th" |
| 1000 | | |
| 1100 | | |
| 1200 | | T1, "w" |
| 1300 | | |
| 1400 | | |
| 1500 | | |
| 1600 | | |
| 1700 | | |
| 1800 | T1, "or" | |
| 1900 | T2, "e" | |
| 2000 | T2, "wi" | |
| 2100 | T1, "ld" | T2, "nt" |
| 2200 | T1, "!\n" | |
| 2300 | | T2, "er" |
| 2400 | | |
| 2500 | | |
| Output | T1: "Hellorld!\n"<br>T2: "e wi" | T1: "o, w"<br>T2: "Now is thnter" |

FIG. 3A

| Time | Processor 4-1<br>Initial condition: timestamp request<br>flag 18-1 is set | Processor 4-2<br>Initial condition: timestamp request<br>flag 18-2 is set |
|---|---|---|
| 0 | T1, "He", TS=0<br>Clear timestamp request flag 18-1 | |
| 100 | | |
| 200 | | |
| 300 | T1, "ll" | |
| 400 | Context switch! Set timestamp request flag 18-1 | |
| 500 | | T2, "No", TS=500 |
| 600 | | T2, "w" |
| 650 | | Context switch! Set timestamp request flag 18-2 |
| 700 | | T1, "o", TS=700<br>Clear timestamp request flag 18-2 |
| 750 | | Context switch! Set timestamp request flag 18-2 |
| 800 | | T2, "is", TS=800<br>Clear timestamp request flag 18-2 |
| 900 | | T2, "th" |
| 1000 | | |
| 1100 | | Context switch! Set timestamp request flag 18-2 |
| 1200 | | T1, "w", TS=1200<br>Clear timestamp request flag 18-2 |
| 1300 | | |
| 1400 | | Context switch! Set timestamp request flag 18-2 |
| 1500 | | Context switch! Set timestamp request flag 18-2 |
| 1600 | | Context switch! Set timestamp request flag 18-2 |
| 1700 | | |
| 1800 | T1, "or", TS=1800<br>Clear timestamp request flag 18-1 | |
| 1850 | Context switch! Set timestamp request flag 18-1 | |
| 1900 | T2, "e", TS=1900<br>Clear timestamp request flag 18-1 | |
| 2000 | T2, "wi" | |
| 2050 | Context switch! Set timestamp request flag 18-1 | |
| 2100 | T1, "ld", TS=2100<br>Clear timestamp request flag 18-1 | T2, "nt", TS=2100<br>Clear timestamp request flag 18-2 |
| 2200 | T1, "!\n" | |
| 2300 | | T2, "er" |
| 2400 | | |

FIG. 4

| Processor 4-1 trace output |
|---|
| T1, "He", TS=0 |
| T1, "ll", TS=0...700 |
| T1, "or", TS=1800 |
| T2, "e", TS=1900 |
| T2, "wi", TS=1900...2100 |
| T1, "1d", TS=2100 |
| T1, "!\n", TS=2100...∞ |

| Processor 4-2 trace output |
|---|
| T2, "No", TS=500 |
| T2, "w", TS=500...700 |
| T1, "o", TS=700 |
| T2, "is", TS=800 |
| T2, "th", TS=800...1200 |
| T1, "w", TS=1200 |
| T2, "nt", TS=2100 |
| T2, "er", TS=2100...∞ |

FIG. 5A

| T1 trace stream |
|---|
| T1, "He", TS=0 |
| T1, "ll", TS=0...700 |
| T1, "o", TS=700 |
| T1, "w", TS=1200 |
| T1, "or", TS=1800 |
| T1, "1d", TS=2100 |
| T1, "!\n", TS=2100...∞ |

T1: "Hello, world!\n"

| T2 trace stream |
|---|
| T2, "No", TS=500 |
| T2, "w", TS=500...700 |
| T2, "is", TS=800 |
| T2, "th", TS=800...1200 |
| T2, "e", TS=1900 |
| T2, "wi", TS=1900...2100 |
| T2, "nt", TS=2100 |
| T2, "er", TS=2100...∞ |

T2: "Now is the winter"

FIG. 5B

METHOD, APPARATUS AND TRACE MODULE FOR GENERATING TIMESTAMPS

TECHNICAL FIELD

The present invention relates to the field of data processing. In particular, the invention relates to the generation of timestamps while tracing characteristics of data processing.

BACKGROUND

Trace modules for generating trace information indicating characteristics of processing performed by a processing apparatus are known. It is possible to generate timestamps indicating the time of generation of trace packets and to insert the timestamps into the trace stream periodically. However, such timestamps use up trace bandwidth since they increase the amount of trace data in the trace stream. If cycle-accurate trace is enabled, then fewer timestamps can be generated, but in this case then more trace data is needed so again this can be expensive in terms of trace buffer capacity and trace port bandwidth. On the other hand, too few timestamps can prevent the order of generation of trace packets from being deduced from the trace streams. The present invention seeks to generate timestamps in an efficient way, in order to reduce the number of trace packets generated by the trace module while still enabling the correlation between trace streams to be established.

SUMMARY

The present technique provides a data processing method comprising the steps of:
processing data using a data processing apparatus;
generating trace packets indicative of at least one characteristic of said data processing apparatus or said processing;
on an occurrence of a predetermined event, setting a timestamp request flag to indicate that a timestamp request is pending;
upon generation of a following trace packet, checking whether the timestamp request flag indicates that a timestamp request is pending; and
when the timestamp request flag indicates that a timestamp request is pending, generating a timestamp corresponding to said following trace packet and setting the timestamp request flag to indicate that no timestamp request is pending.

In the present technique, trace packets indicative of at least one characteristic of a data processing apparatus or data processing performed by the apparatus are generated. When a predetermined event occurs, a procedure for generating a timestamp is triggered. However, the present technique recognises that it is not desirable to generate the timestamp immediately on the occurrence of a predetermined event. Instead, when the predetermined event occurs, a timestamp request flag is set, indicating that a timestamp request is pending. Then, upon generation of a following trace packet, the timestamp request flag is checked to see whether a timestamp request is pending, and when the timestamp request flag indicates that a timestamp request is pending, a timestamp corresponding to the following trace packet is generated, and the timestamp request flag is then set to indicate that no timestamp request is pending. This technique forces the timestamp to be generated at a point where a new trace packet is also generated. This means that the timestamp can be output with the generated following trace packet, thus avoiding a timestamp packet being inserted into the trace stream when no trace data has been generated. By avoiding the generation of packets that only contain a timestamp and do not contain any trace data, the trace stream contains fewer trace packets and so the trace bandwidth of, for example, a trace buffer or a trace output port, is used more efficiently. Also, the present technique means that, if no more trace packets are output for a particular trace stream (for example, if the processing being monitored has been completed), then no timestamp is inserted into the stream during that time and so trace resources are conserved.

Many types of event may be used as the predetermined event that triggers the setting of the timestamp request flag to indicate that a timestamp request is pending. The predetermined event may be an event occurring during the data processing, or an external event that occurs independently of the data processing.

For example, in a system comprising a plurality of processors for executing a plurality of threads, the predetermined event may include a transfer of execution of one of the plurality of threads from one of the plurality of processors to another of the plurality of processors. In such a system, separate trace streams may be generated for the respective processors. In a symmetric multi-processor system, a particular thread may be executed using more than one processor, such that threads migrate between different processors. When such threads are being traced then there can be a problem that trace streams corresponding to those processors become disjoint (such that each trace stream comprises fragments of trace data corresponding to different threads). Without the present technique, the times at which trace packets in different trace streams were generated cannot be correlated with one another. This problem is addressed by forcing a timestamp to be issued after each transfer of a thread between processors. Upper and lower bounds can then be placed on the time of generation of each trace packet and the order in which trace packets for a particular thread were generated can be reconstructed using the generated timestamps.

The predetermined event may also include an exception event. Exception events are events that trigger an interruption to data processing. Therefore, the instances at which an exception event occurs can indicate a point in the trace stream at which neighbouring trace packets were generated at non-consecutive points in time. By triggering a timestamp request on the occurrence of an exception event, the following trace packet will be generated together with a timestamp and so exception points can be identified in the trace stream.

The predetermined event may also include a start of execution of an exception handling thread, and/or a return to said processing following execution of an exception handling thread. This can be useful if the trace module does not have visibility of the signal triggering an exception event in the processor core, but does have visibility of the operations being performed by the processor. Rather than monitoring the exception event, the operations performed after the exception (for example, the first operation of an exception or interrupt handling routine) or after normal processing returns can be used to identify the interruption. Triggering the generation of timestamps at these points helps to correlate the trace data.

Another type of predetermined event can be a context switch which occurs when the processor is placed in a different state for processing instructions. For example, a processor may have several threads to perform, each thread consisting of a sequence of operations performed in a given state, otherwise referred to as a context. Such context switches may result in interruptions to data processing being performed, and so a context switch can be useful point to record a timestamp in the trace stream.

The predetermined event may also include a context synchronization event. When a context switch occurs, then a processing pipeline may need to be flushed of instructions so that following the context switch the instructions fetched into the pipeline will be processed using the new context. This may result in a different operation being processed after the context switch than was processed before the context switch. Therefore, the context synchronization event can be an indicator of an interruption of processing and so it is useful to request a timestamp at this point. For some types of trace module, the context synchronization event may be easier to identify than the context switch itself, since the context synchronization event can be triggered by an instruction while the context switch could be identified by monitoring context register values which may not be visible to the trace module. A start of an exception handling thread, and the return to said processing following an exception handling may also be context synchronization events.

It will be appreciated that the above examples of predetermined event could be used to trigger timestamp requests individually, or in combination so that the timestamp request flag is set when any of one or more different types of predetermined event occurs.

The present technique may also comprise a step of selectively enabling or disabling generation of said trace packets; wherein:

upon said occurrence of said at least one predetermined event, said timestamp request flag is set to indicate that a timestamp request is pending, independently of whether said generation of said trace packets is enabled or disabled; and upon generation of a following trace packet after re-enabling said generation of trace packets and when said timestamp request flag indicates that a timestamp request is pending, said timestamp is generated corresponding to the following trace packet and said timestamp request flag is set to indicate that no timestamp request is pending.

A trace module for generating trace information indicating the operation of a processor need not be enabled all the time. When, for example, data processing whose operation is well known is being performed, or when it is desired to save on trace bandwidth, then the trace module can be disabled to save trace resources. Therefore the trace module may have logic for enabling or disabling generation of trace packets. The present technique recognises that if generation of trace packets is disabled and then later re-enabled during data processing, it is possible that a trace stream may be monitoring a different process following re-enablement of the generation of trace packets than before the generation of trace packets was disabled. In this case, it is useful to include a timestamp following re-enabling of the generation of trace packets. Therefore, while the generation of trace packets is disabled, the present technique continues to monitor whether or not the at least one predetermined event has occurred, and if such an event has occurred, then the timestamp request flag is set to indicate a pending timestamp request, independently of whether the generation of trace packets is enabled or disabled. When a following trace packet is generated after re-enabling the generation of trace packets, then if the timestamp request flag indicates that a timestamp request is pending, the timestamp is generated. This enables reconstruction of the order of generation of trace packets that were generated before and after the disabling of generation of trace packets.

In the present technique, software executed by the data processing apparatus may control the data processing apparatus upon occurrence of the predetermined event to set the timestamp request flag to indicate that a timestamp request is pending.

The present technique realizes that not all trace modules have visibility of the operations being performed by the data processing apparatus, and so the trace module may not be aware of the instances at which the data processing apparatus encounters a predetermined event. For example, a memory-mapped instrumentation trace macrocell (ITM) has visibility of some of the data output by a processing apparatus, but does not have visibility of the processing performed by the processing apparatus. For such trace modules, it is useful to configure software to control the processing apparatus to respond to an occurrence of the predetermined event by setting the timestamp request flag indicating that a timestamp request is pending. The software may, for example, be the kernel of the operating system of the processing apparatus which could set the flag upon occurrence of the predetermined event.

The timestamp request flag may be a programmable register of a trace module used for generating the trace packets. The processing apparatus may provide a signal to the programmable register of the trace module when any predetermined significant event occurs, thus informing the trace module that generation of a timestamp is requested. The trace module then generates a timestamp upon generation of the following trace packet.

In a further feature of the present technique, the timestamp request flag may be set to indicate that a timestamp request is pending by the data processing apparatus writing to the programmable register on occurrence of the predetermined event. Thus, the processing apparatus can inform the trace module that generation of a timestamp is requested. The processing apparatus treats the programmable register of the trace module as a "request following piece of data is time-stamped" register.

Some systems having trace capability may operate with more than one timing scheme. For example, local trace sources, such as an embedded trace macrocell (ETM) or instrumentation trace macrocell (ITM) that are provided within a single processor cluster, may operate in accordance with a local time generator, while an external timing scheme may also be used. In such cases, it is useful to provide for correlation between the two or more different timing schemes. The present technique can be applied to such systems by applying the generated timestamp to a timestamp correlation trace packet for correlating timestamp values of a first timing scheme with timestamp values of a second timing scheme. Thus, if the timestamp request flag is set when the following trace packet is generated, the correlation trace packet is inserted into the trace stream as well as the following trace packet. The correlation trace packet can then be analysed to provide correlation between the different timing schemes. The present technique of delaying generation of the correlation packet until generation of the following trace packet is useful because it means that if the following trace packet is never generated (i.e. trace packet generation has stopped), then the correlation packet is not output, thus saving trace bandwidth.

Alternatively, or as well as the use of the correlation trace packet, the timestamp may be a time value appended to the following trace packet. For example, the time value may be added to a header of the following trace packet. This form of timestamp avoids the generation of an extra trace packet dedicated to recording a timestamp and so results in fewer trace packets being generated.

The trace packets generated may indicate many types of characteristics of the data processing apparatus or the data processing performed by the data processing apparatus. For example, the trace packets may indicate characteristics of at least one of:

data processed during said processing;
   data generated during said processing;
   instructions executed during said processing;
   memory addresses accessed during said processing;
   values stored in registers of said data processing apparatus; and
   the occurrence of a hardware event.

The hardware event may include, for example, the start of processing using a hardware accelerator, co-processor, or other processing circuitry of the data processing apparatus, or the receipt of an external signal.

In an embodiment, the following trace packet may be the next trace packet generated after the occurrence of the predetermined event. This means that in a generated trace stream, a timestamped trace packet indicates that the predetermined event occurred at some time between the generation of the trace packet immediately preceding the timestamped trace packet and the generation of the timestamped trace packet.

In another embodiment, the following trace packet may be one of the next trace packet and a later trace packet generated after the generation of the next trace packet.

It may be desirable on some occasions to postpone the generation of the timestamp until two or more following trace packets have been generated. For example, in some situations a group of trace packets may be generated in relation to a single operation. Sometimes, when the predetermined event occurs, such a group of trace packets may be being generated relating to a previous operation, and trace packets relating to the first operation that occurs after the event may be of more interest than the group of trace packets relating to the previous operation. Therefore, the timestamp can be generated at the first trace packet that is not part of the group of trace packets relating to the previous operation. For example, if a first operation corresponds to a first group of trace packets ("1p", "1q", "1r" and "1s", say) and a second operation relates to a second group of trace packets ("2p", "2q", "2r" and "2s", say), then generation of a timestamp corresponding to an event occurring during the first operation could be delayed until the first trace packet ("2p") is generated after the first operation has completed. If the generation times of some types of packets (e.g. the "q", "r" or "s" packets) are not of interest, then it can be useful to conserve trace bandwidth (and avoid risking overflow of trace resources) by postponing generation of the timestamp until the next trace packet whose timing is of interest (e.g. the next "p" packet) is generated.

In some situations there may be several types of trace packet and the first trace packet generated after the event is not of a type the generation time of which is of interest. In a first example, the types of trace packet may include control trace packets and data trace packets. Sometimes the first trace packet after the event may be a control trace packet, the generation time of which is of less interest than that of a data trace packet. Therefore, generation of the timestamp could be postponed until the first data trace packet after the event. In a second example, the types of trace packet may include marker trace packets and data trace packets. Sometimes the first trace packet after the event may be a data trace packet, the generation time of which is of less interest than that of a marker trace packet. Therefore, generation of the timestamp could be postponed until the first marker trace packet after the event. In a third example, the types of trace packet may include marked trace packets and unmarked trace packets. The operation generating trace packets may use the mark to indicate whether or not the trace packet is of a type the generation time of which is of interest. After the timestamp request flag has been set, a timestamp could be generated when a following marked trace packet is generated, but not when a following unmarked trace packet is generated.

Alternatively, in some situations there may be several types of trace packet and the first trace packet generated after the event is of a type that, due to the way the trace protocol is designed, cannot have a timestamp associated with it. For example, the types of trace packet may include framing packets, and the trace protocol may be designed such that a framing packet cannot have a timestamp associated with it. Sometimes the first trace packet after the event may be a framing packet, and therefore, generation of the timestamp could be postponed until the first trace packet after the event that is not a framing packet.

Alternatively, in some situations there may be several sources of trace packet, and the first trace packet generated after the event is not from a source the generation time of which is of interest. For example, there may be control thread sources and application thread sources. Sometimes the first trace packet after the event may be generated by a control thread, the generation time of which is of less interest than that of a trace packet generated by an application thread. Therefore, generation of the timestamp could be postponed until the first trace packet generated by an application thread after the event.

Alternatively, if temporarily there is insufficient trace bandwidth to handle a timestamped trace packet, then generation of the timestamp could be postponed until sufficient bandwidth becomes available. In this case, the following trace packet could occur several trace packets after the occurrence of the predetermined event.

Viewed from another aspect, the present technique provides a data processing apparatus comprising:

processing circuitry for processing data; and
   tracing circuitry for generating trace packets indicative of at least one characteristic of said data processing apparatus or said processing performed by said processing circuitry; wherein:
   at least one of said processing circuitry and said tracing circuitry is responsive to an occurrence of a predetermined event to set a timestamp request flag to indicate that a timestamp request is pending; and
   upon generation of a following trace packet by said tracing circuitry, said tracing circuitry is configured to check whether or not said timestamp request flag indicates that a timestamp request is pending and, when said timestamp request flag indicates that a timestamp request is pending, to generate a timestamp corresponding to said following trace packet and to set said timestamp request flag to indicate that no timestamp request is pending.

Viewed from yet another aspect, the present technique provides a trace module for performing tracing operations on a data processing apparatus, the trace module comprising:

tracing circuitry for generating trace packets indicative of at least one characteristic of said data processing apparatus or processing performed by said data processing apparatus; and
   a timestamp request flag for indicating whether or not a timestamp request is pending; wherein:
   upon generation of a following trace packet by said tracing circuitry, said tracing circuitry is configured to check whether or not said timestamp request flag indicates that a timestamp request is pending and, when said timestamp request flag indicates that a timestamp request is pending, to generate a timestamp corresponding to said following trace packet and to set said timestamp request flag to indicate that no timestamp request is pending.

The above, and other objects, features and advantages of this invention will be apparent from the following detailed description of illustrative embodiments which is to be read in connection with the accompanying drawings.

BRIEF DESCRIPTION OF THE ACCOMPANYING DRAWINGS

FIG. 1 schematically illustrates a data processing apparatus having a trace module for generating trace packets indicative of data processing of the apparatus;

FIG. 3A illustrates an example of generating two trace streams, without using the timestamp generation technique in which timestamp requests are issued on the occurrence of a predetermined event;

FIG. 4 illustrates the generation of two trace streams wherein timestamp generation is requested following the occurrence of an exception event;

FIG. 5A illustrates a step of processing the trace streams output in the example of FIG. 4, wherein bounds are set for the generation time of any unstamped trace packets;

FIG. 5B illustrates the trace streams separated into the trace packets corresponding to respective processes, with the trace packets sorted into chronological order;

DETAILED DESCRIPTION OF NON-LIMITING EXAMPLE EMBODIMENTS

Figure 1:
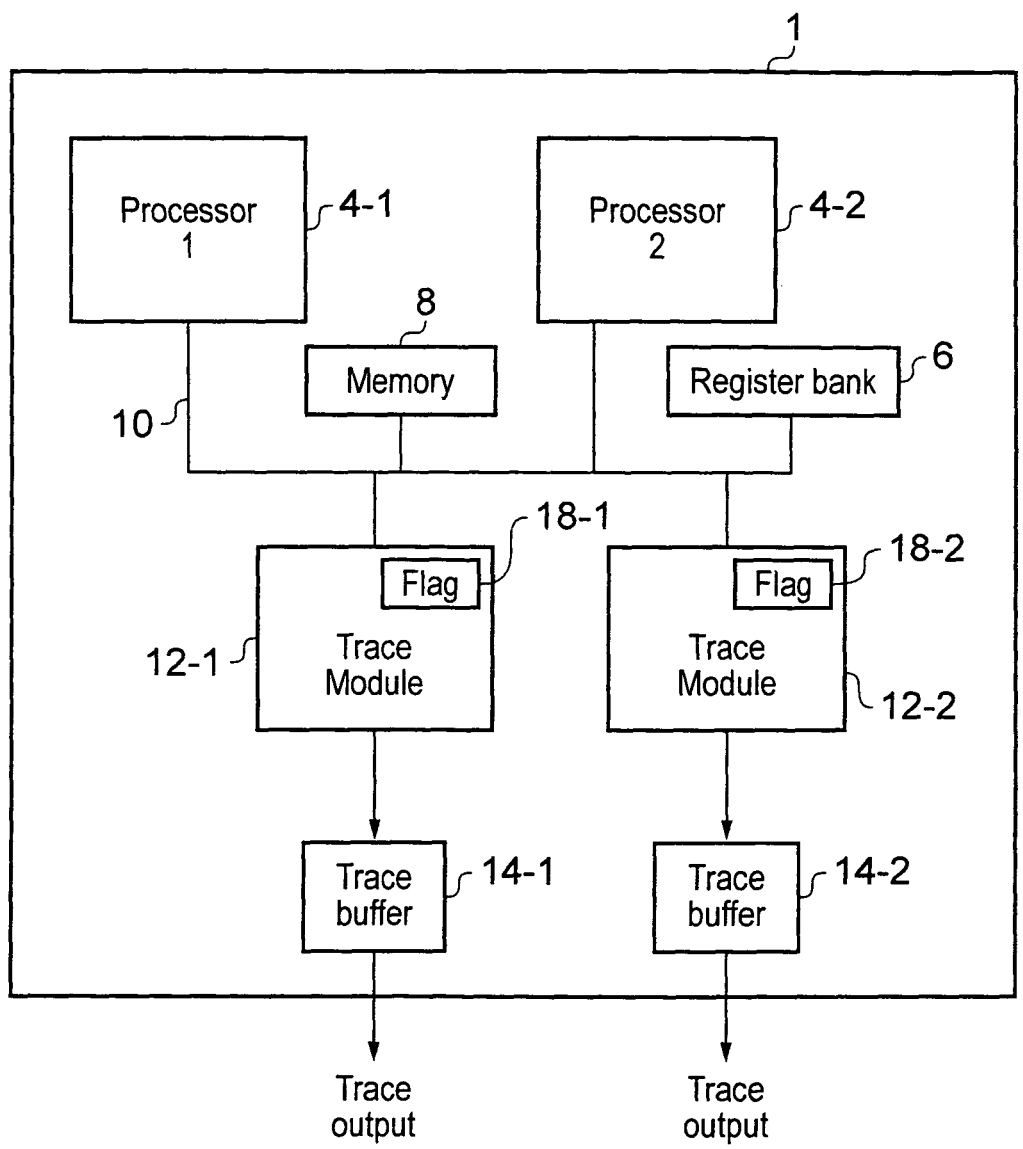

FIG. 1 schematically illustrates a data processing apparatus 1. The data processing apparatus 1 comprises processing circuitry including at least one processor 4. In the example of FIG. 1, there are two processors: a first processor 4-1, and a second processor 4-2. In the following description, where a processor is referred to generally and it is not important which particular processor is being referred to, the reference numeral 4 will be used to represent the processor. It will be appreciated that the processing circuitry may also include other processing components such as hardware accelerators, co-processors or graphics processing units, for example.

The data processing apparatus 1 also comprises a register bank 6 for storing values used during processing and a memory 8 for storing data and instructions for use by the processor 4. The processor 4, the register bank 6 and the memory 8 are connected via a bus 10.

The processing apparatus 1 also comprises at least one trace module 12 for generating trace data indicative of characteristics of the processing apparatus 1 and the data processing performed by the apparatus 1. In FIG. 1 an example is shown where there are two trace modules 12-1, 12-2, but where a trace module is referred to generally without reference to a particular trace module, the reference numeral 12 will be used. While the trace module 12 of FIG. 1 is shown within the data processing apparatus 1, the trace module may also be an external trace module located outside the housing of the data processing apparatus 1. The trace module 12 generates trace data and outputs the trace data to a trace buffer 14, where the data may be stored on-chip or output off-chip. The trace data may be analysed to provide diagnostic or debugging information about the apparatus 1, and may include diagnostic and debugging information about the processing performed by the processor 4.

Where more than one trace module 12 is provided, each trace module may have a different function. For example, in the arrangement shown in FIG. 1, the trace module 12-1 could monitor threads executed by the processor 4-1, while the trace module 12-2 monitors threads executed by the processor 4-2. Alternatively, both trace modules 12-1, 12-2 could monitor a single processor 4 but could provide different tracing functionality. For example, the trace module 12-1 could provide a program flow trace that monitors the instructions being processed by the processor 4, while the trace module 12-2 could provide an instrumentation trace that does not have visibility of the instructions being executed but instead can monitor the data being input and output over the bus 10. Thus, at least one trace stream can be generated by the trace module(s) 12. The trace stream comprises at least one trace packet, each trace packet indicating one or more characteristics of the apparatus 1 or the data processing performed by the processor 4. Many types of characteristics may be monitored by the trace module 12, as will be discussed later with reference to FIG. 6.

When analysing a trace stream to obtain diagnostic or debugging information from the packets of the trace stream, it can be useful to be able to deduce the time and/or order of generation of the trace packets. This is particularly the case when two or more trace streams are generated, where the task of correlating the times at which trace packets of different trace streams were generated is not trivial. Therefore, the trace module 12 may generate timestamps which are inserted into the trace stream to provide a reference point to enable correlation of different streams. In the present technique, generation of timestamps is forced to occur at a point when a trace packet is being generated. This is done by providing each trace module 12 with a timestamp request flag (or "sticky flag") 18. Upon occurrence of a predetermined significant event, the flag 18 is set to indicate that a timestamp request is pending. Then, when the trace module generates the following trace packet of the trace stream, the trace module checks the timestamp request flag 18 to see whether it indicates a pending timestamp request. If a request is pending, then the trace module 12 generates a timestamp along with the following trace packet. By forcing the timestamps to be generated together with a following trace packet, the generation of trace packets only including a timestamp, not any trace data, is avoided. Also, the generated timestamps can be more useful because they are fixed to a particular piece of trace data representing a particular point in data processing being performed by the apparatus 1, rather than being placed anywhere between two trace packets which would occur if timestamps were issued immediately upon a significant event occurring. This means that the time of generation of more trace packets may be accurately determined.

In the embodiment which will be described below, the following trace packet is the next trace packet generated after occurrence of the predetermined event.

Figure 2:
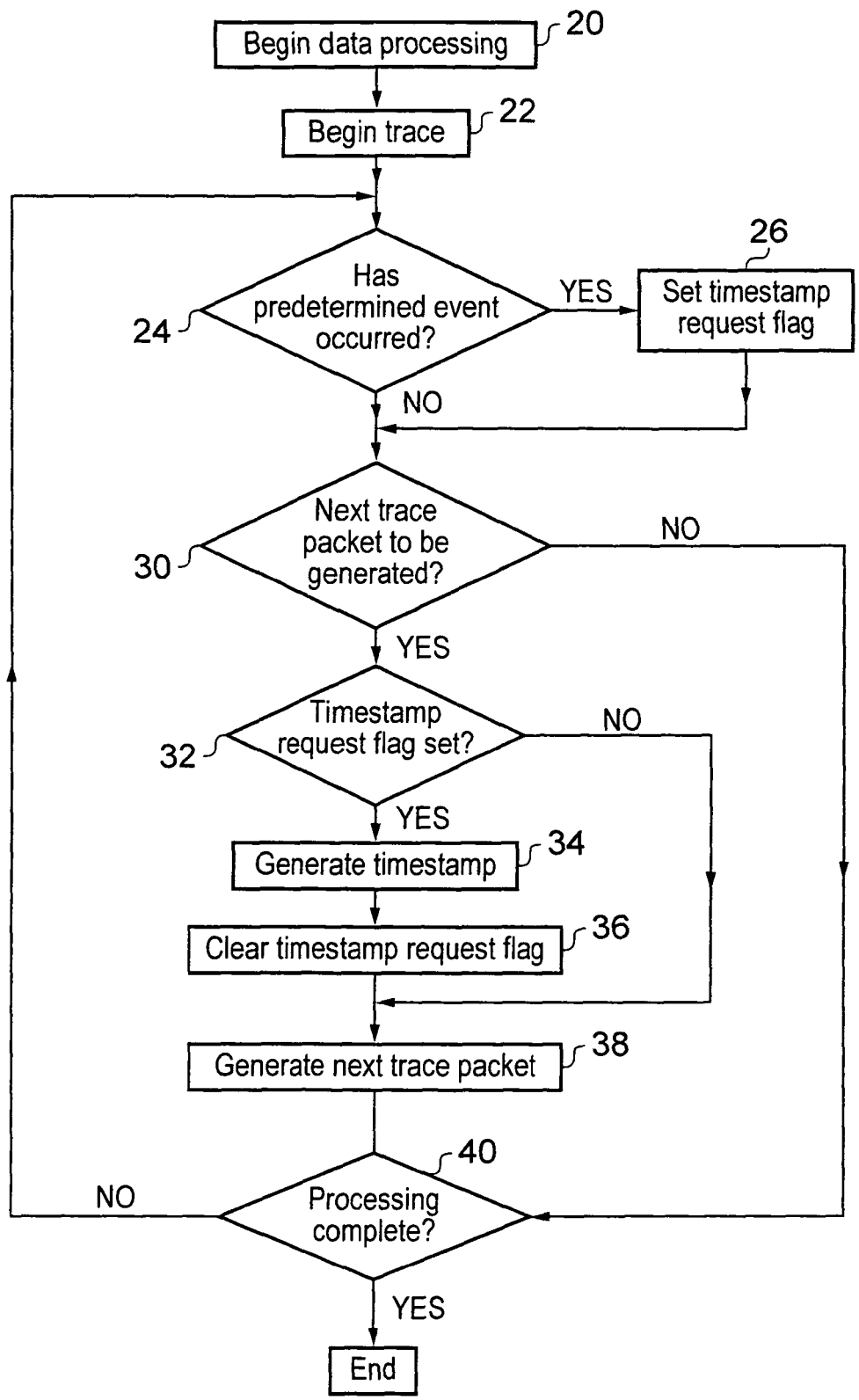
FIG. 2 illustrates a method for generating a trace stream and timestamps indicating the time of generation of corresponding trace packets of the trace stream.

FIG. 2 illustrates a method of generating timestamps and trace packets. At step 20, data processing begins. Then, at step 22, the trace module 12 begins tracing characteristics of the processing apparatus 1 or the data processing. The word "trace" in this context is used to mean the monitoring of the operation of the apparatus 1, and does not necessarily require trace packets of trace data to be generated by the trace module 12 (as will be seen later in the discussion of FIG. 8, it is possible to disable generation of trace packets while continuing to trace the operations of the processor 4).

While tracing, at step 24 the trace module 12 determines whether a predetermined event has occurred. A predetermined event is any of one or more types of event whose occurrence triggers a request for generation of a timestamp. Various kinds of predetermined event shall be discussed below. The trace module 12 may determine whether the predetermined event has occurred in various different ways. If the trace module 12 has visibility of the instructions processed by the processor 4, then the trace module 12 can itself determine the points at which a predetermined event has occurred by monitoring the executed instructions. For example, a program flow trace module has such capability. Alternatively, the processor 4 or other component of the apparatus 1 could provide a signal to the trace module 12 indicating that a predetermined event has occurred. This may be more useful if the trace module 12 does not have visibility of the instruction flow processed by the processor 4, but merely monitors the data input and output by the processor 4. For example, an instrumentation trace module could use a signal from the processor 4 to indicate that a predetermined event has happened.

If the trace module 12 determines that a predetermined event has occurred, then the method proceeds to step 26, where the timestamp request flag 18 is set to indicate that a timestamp request is pending. On the other hand, if no predetermined event has happened, then the flag 18 is not set to indicate a pending timestamp request. Regardless of whether or not the predetermined event has occurred, at step 30 it is determined whether the next trace packet in the trace stream should be generated. If no trace packet is to be generated then flow proceeds to step 40 at which it is again determined whether processing has completed. If processing is complete then the method ends, while if processing is still to be performed then the method returns to step 24 to check again for a predetermined event.

When it is determined at step 30 that the next trace packet is to be generated, the method proceeds to step 32 where the trace module determines whether the timestamp request flag 18 has been set to indicate a pending timestamp request. If the timestamp request flag indicates a pending timestamp request, then at step 34 a timestamp is generated. The timestamp may have various formats, as will be described later with reference to FIGS. 6 and 7. The timestamp can, for example, be output as a packet coming before the next trace packet in the trace stream, can be output as a packet coming after the next trace packet in the trace stream, can be generated by converting the next trace packet from a type that may not have a timestamp into a type that has a timestamp, or can be generated in other forms. After the timestamp is generated, then the timestamp request flag 18 is cleared at step 36 so that it no longer indicates a pending timestamp request. This means that a timestamp will not be generated until another predetermined event has occurred, or a timestamp is requested as part of normal tracing. Steps 34 and 36 are not performed if the timestamp request flag has not been set.

Whether or not the timestamp was generated, then at step 38 the next trace packet is generated by the trace module 12. The trace packet generated can be output to the trace buffer 14 and, optionally, output from the data processing apparatus 1 so that it can be analysed. At step 40, the method then proceeds to check whether or not the processing performed by the processor 4 is complete. If the processing is complete then the method ends, while if processing continues then the method returns to step 24 where it is determined whether another predetermined event has occurred.

As can be seen from FIG. 2, the generation of the timestamp does not occur immediately following occurrence of the predetermined event. Instead, the setting of the flag 18 causes a timestamp to be issued upon generation of the next trace packet in the trace stream. This avoids a timestamp packet being produced when no trace data is generated, thus avoiding the generation of an unnecessarily large number of trace packets, and avoiding long periods of trace output containing only timestamps. Also, the timestamps are tied to a significant point in the program, since they are issued at points at which an event of interest has occurred. This means that the timestamps are more likely to be placed at points where temporal correlation will be useful and so can provide better diagnostic information than timestamps placed at other points in the trace stream. The present technique allows the relative timings of generation of trace data to be reconstructed more accurately, while avoiding an overflow of the trace buffer 14 which would occur if timestamps were issued every time trace data is generated.

Figure 3B:
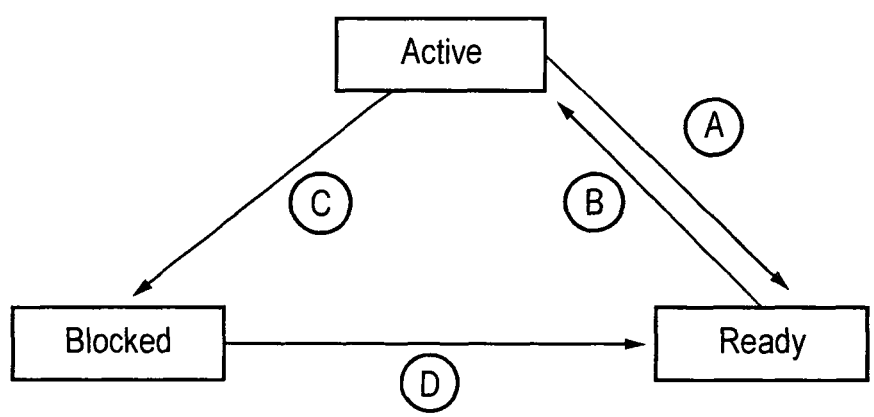
FIG. 3B illustrates a thread state diagram.

FIG. 3A illustrates an example in which threads being executed on processors 4-1, 4-2 are monitored by the trace modules 12-1, 12-2. In a symmetric multi-processor (SMP) system, threads can migrate between processors in order to improve thread throughput of the multi-processor system. To manage this, the system maintains the state of each thread in a data structure stored the shared memory 8. In a simple system, each thread may be in one of three states: active (also known as running), ready (also known as waiting) or blocked (see FIG. 3B). For example, if the thread being traced is executing, then it is in the active state. However, if one processor is required to execute an exception handling thread instead of a thread being traced, then the thread being traced is placed into the ready state (transition A in FIG. 3B). Other processor(s) may be controlled to take over execution of threads in the ready state, such as those threads previously being processed by the interrupted processor, so that threads that were interrupted by the exception handling routine can still be permitted to complete (by returning the thread to the active state—transition B in FIG. 3B). This improves forward progress in execution of the threads. If an active thread requires a piece of data which is not yet available then execution of the thread is halted and the thread is placed in the blocked state (transition C in FIG. 3B). Once the data becomes available then the thread is placed in the ready state (transition D in FIG. 3B), ready for processing of the thread to continue once a processor becomes available.

However, a problem arises when different trace streams are generated and the trace streams are timestamped using a known timestamping technique. This is illustrated by FIG. 3A. FIG. 3A illustrates two threads T1 and T2 which are executed by processors 4-1 and 4-2. Thread T1 begins execution on processor 4-1. However, an exception event occurring during execution of T1 forces processor 4-1 to be occupied processing other threads that are not being monitored by the trace module 12-1. Therefore, processor 4-1 puts thread T1 into the ready state, meaning that processor 4-2 is able to processes sections of thread T1. During execution of the threads T1 and T2, the trace modules 12-1 and 12-2 may output trace packets as illustrated in FIG. 3A. In previous timestamping techniques, only the start of a particular thread may be timestamped, as illustrated in FIG. 3A where the first packet in threads T1 and T2 are both timestamped but none of the other trace packets are timestamped. A problem with this technique arises when the threads are transferred from one processor to another so that each trace stream includes trace packets corresponding to several different threads. The trace packets are mixed together, and because none of the later trace packets has been timestamped, it is not possible to determine the order in which the trace packets of a particular trace stream were generated. Thus, it is not possible to join the fragments of T1 and T2 trace packets back together in the correct order.

FIG. 4 shows an example of the trace packets generated when the same threads as in FIG. 3A are executed, but in which the timestamping of the present technique is applied. In the present technique, at the occurrence of a predetermined event, the timestamp request flag 18 is set. This indicates that when the next trace packet is generated, then a timestamp should be generated as well. In the example of FIG. 4, the predetermined event is a context synchronization event.

In FIG. 4, the processor 4-1 begins processing thread T1, and the trace module 12-1 generates two trace packets at times 0 and 300. At time 400, thread T1 is interrupted and processor 4-1 executes a context switch. As part of the context switch, thread T1 is placed in the ready state, and processor 4-1 encounters a context synchronization event. The context synchronization event causes the timestamp request flag 18-1 to be set. Similarly, at time 650, thread T2, which was executing on processor 4-2, is interrupted and processor 4-2 executes a context switch. As part of this context switch, thread T1 is taken out of the ready state and into the active state, that is, it begins execution on processor 4-2, processor 4-2 having first executed a context synchronization event. The context synchronization event causes timestamp request flag 18-2 to be set.

Thus when, at time 700, thread T1 executing on processor 4-2 generates a trace packet through trace module 12-2, the trace packet has a timestamp attached containing the time value 700. The timestamp request flag, 18-2, is subsequently reset.

Similarly, whenever a context switch occurs at either processor 4-1 or processor 4-2, a context synchronization event is encountered, the corresponding timestamp request flag 18-1 or 18-2 is set, and the next generated trace packet is generated together with a timestamp indicating the time at which the trace packet was generated. Each time a timestamp is generated, the flag is reset in order to clear the timestamp request.

At times 1400-1600, three context switches occur without any trace packets being output between the context switches. If timestamps were generated immediately on each context switch then trace bandwidth would be wasted since multiple trace packets containing only a timestamp and no trace data would be generated in the present technique, the timestamp request is set following the first context switch at time 1400 and then maintained until the next trace packet is generated at time 2100, at which point a single timestamp is generated. Thus, trace bandwidth is conserved.

Unlike the timestamping shown in FIG. 3A, the timestamping shown in FIG. 4 enables the order of the trace streams to be reconstructed. This is done in two steps, as shown in FIGS. 5A and 5B. First, the time of generation of any trace packets that were not timestamped is estimated. This is done by placing bounds on possible generation times for these packets.

An unstamped packet must come on or after the most recent timestamp in the same trace output stream. Therefore, the most recent timestamp indicates a lower bound for the time associated with an unstamped packet. Also, no intervening context switch can have occurred between generation of the most recent timestamp and generation of the unstamped trace packet, as such an event would have caused the processor to encounter a context synchronization event, which would in turn set the timestamp request flag 18. Therefore the unstamped trace packet must have been generated before the next timestamp value in the same trace stream. Therefore the next timestamp value indicates an upper bound for the time associated with the unstamped packet. However, by employing a further understanding of the process of thread migration, an improved upper bound can be set.

The process of migrating a thread between processors involves a first context switch on a first processor and a second context switch on a second processor. The second context switch must occur after the first context switch, because the first context switch takes the thread out of the active state and puts it into the ready state and the second context switch only selects threads in the ready state. Access to the state of threads is synchronized by software to ensure correct ordering.

Therefore the unstamped trace packet must have been generated before the next highest timestamp value in any of the trace streams associated with the same thread as the unstamped trace packet, because the presence of the next highest timestamp value indicates that the next context switch selecting said thread occurred after the unstamped packet was generated.

FIG. 5A illustrates this step of placing bounds on the generation times of all unstamped packets. For example, the second packet in the trace output of the trace module 12-1 monitoring the first processor 4-1 has no timestamp. Therefore, it must have been generated without interruption between the generation of the first trace packet at time 0 and the generation of the second trace packet. This means that the lower bound for the time of generation of the second trace packet must be 0. Also, the next highest timestamp associated with thread T1 (in any trace stream) is at time 700 in the third trace packet of the output of processor 4-2. Therefore the upper bound of the time of generation of the second packet must be 700. As shown in FIG. 5A, in a similar way bounds can be placed on the generation times of all the other unstamped packets.

Having placed bounds on all packets, the trace packets can then be extracted and arranged in timestamp order for each separate thread (see FIG. 5B). If there is more than one trace packet having the same bounds for the generation time (this should occur when these packets are in the same trace stream), then place the trace packets in the order in which they appear in the originally output trace stream. Thus, the correct order of generation of the trace packets can be determined and the fragments of the trace packets distributed among the different generated trace streams can be joined together. Therefore, unlike the example shown in FIG. 3A, the trace streams can be analysed correctly.

FIGS. 3A and 4 show an example where different trace streams are output by different trace modules 12 monitoring threads performed on different processors 4. However, the timestamping technique may also be useful where threads running on the same processor are monitored in two or more different ways by different trace modules 12 (for example, one trace module performing a program flow trace while the other trace module performs an instrumentation trace). Also, while FIG. 1 shows separate trace modules 12, it is possible that a single trace module can generate more than one trace stream.

FIG. 4 shows an example of the present technique in which the predetermined event is the occurrence of an exception event. A trace module 12 having visibility of the processor core may detect such an event by detecting a signal used to trigger the exception event. Alternatively, a trace module 12 only having visibility of the data input and output from the processor 4 may detect such an event by detecting the saving of state data associated with an interrupted thread to the memory 8.

Various other types of predetermined event can also be used to trigger generation of a timestamp. For example, rather than using the occurrence of the exception event as the trigger to set a timestamp request flag 18, the predetermined event could be the entry into an exception handling routine or the return to processing a thread being monitored following execution of the exception handling routine.

Also, the execution of some instructions may be dependent on the current state of the processor 4 (the current state is often referred to as the "context"). In pipelined processors, the context can be determined at the time of fetching the instruction into the pipeline. This can mean that if a context switch occurs once instructions have already been fetched into the pipeline, then execution of these instructions may not execute correctly following the context switch. For this reason, a context synchronisation operation may be performed when the context switch is desired. The context synchronisation operation, which may be implemented using an instruction such as an instruction synchronisation barrier instruction, controls the processor to flush the pipeline of instructions and re-fetch the instructions in accordance with the new context. This means that the instructions can be executed correctly following the context switch. For the same reasons as those discussed with respect to FIGS. 3A, 3B, and 4, it is useful to treat one or both of the context switch and the execution of the context synchronisation operation as one of the predetermined events. In this way, a context switch, or a context synchronisation, controls the trace module 12 to set the timestamp request flag and forces a timestamp to be generated upon generation of the next trace packet, thus enabling correlation of trace streams.

Another type of predetermined event may be a transfer of execution of a thread from one processor to another processor. Also, any interruption of a thread may be treated as a predetermined event that controls the setting of the timestamp request flag. Any of the above examples of predetermined events may be used separately or in any combination such that more than one type of predetermined event triggers the setting of the flag 18. For example, for an instrumentation trace, the processor 4 could inform the trace module 12 of the occurrence of any of a context synchronization operation, exception entry or exception return.

Figure 6:
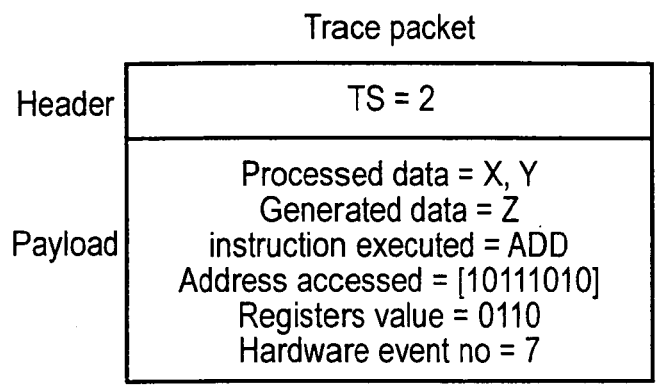
FIG. 6 shows an example format of a trace packet.

FIG. 6 shows an example format of a generated trace packet. Trace packets may include data about various characteristics of the apparatus 1 or the data processing being performed. For example, the trace packet can include in its payload information indicating one or more of the following: data processed by the processor 4 while performing data processing, data generated as a result of data processing, instruction(s) executed during data processing, memory addresses accessed whilst executing the data processing, registers of the register bank 6 accessed by the processor 4 and values stored in those registers, and the occurrence of a hardware event. The hardware events could be, for example, the occurrence of a cache miss, the starting of a direct memory access (DMA) engine, the starting of processing by a hardware accelerator, or any other event signalled by system hardware. The hardware events could be identified in the trace packet payload by a number indicating a particular type of event, for example. The characteristics being traced by the trace module 12 may be characteristics that result from the data processing performed by the processor 4 or may be characteristics of the apparatus 1 or significant events that occur independently of the data processing being performed.

The timestamps generated in correspondence to a generated trace packet may have several forms. For example, as shown in FIG. 6, the timestamp could be a simple numerical value indicating the time at which the timestamp was generated, and could be inserted into a trace packet, either within the payload of the trace packet or as part of a packet header as shown in FIG. 6. Other forms of timestamp are also possible.

Figure 7:
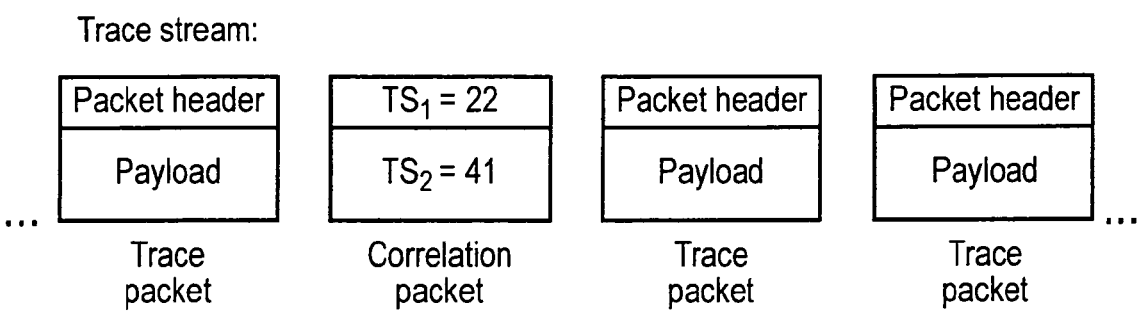
FIG. 7 shows an example of a trace stream including a timestamp correlation packet.

Alternatively, where a system operates using two or more separate timing schemes, it may be useful to provide information for correlating two or more of these timing schemes. For example, one or more trace modules within a single processor cluster may use a local timing scheme generated by a local clock, but external timing scheme(s) may also be available from a global counter or timer and/or from other processor cluster(s). To enable correlation of different time values, the global timer module can pass a global time value across to the trace module 12 on each timer event, and the trace module 12 could timestamp the global time value with a local timestamp value. Thus, the timestamp generated in correspondence to a trace packet could be a correlation packet as shown in FIG. 7 in which, for example, the local timestamp is applied to the header of the correlation trace packet while the global time value is part of the packet payload (or vice versa). Again, such a correlation packet would be inserted into the trace stream only upon generation of the next trace packet and as a result of setting of the timestamp request flag. While the correlation packet represents an additional packet in the trace stream, delaying the issuing of the correlation packet until the next trace packet is generated is still useful because it means that if no more trace data is generated then insertion of one or more unnecessary correlation packets is avoided. This reduces the chance of the trace buffer 14 overflowing.

Figure 8:
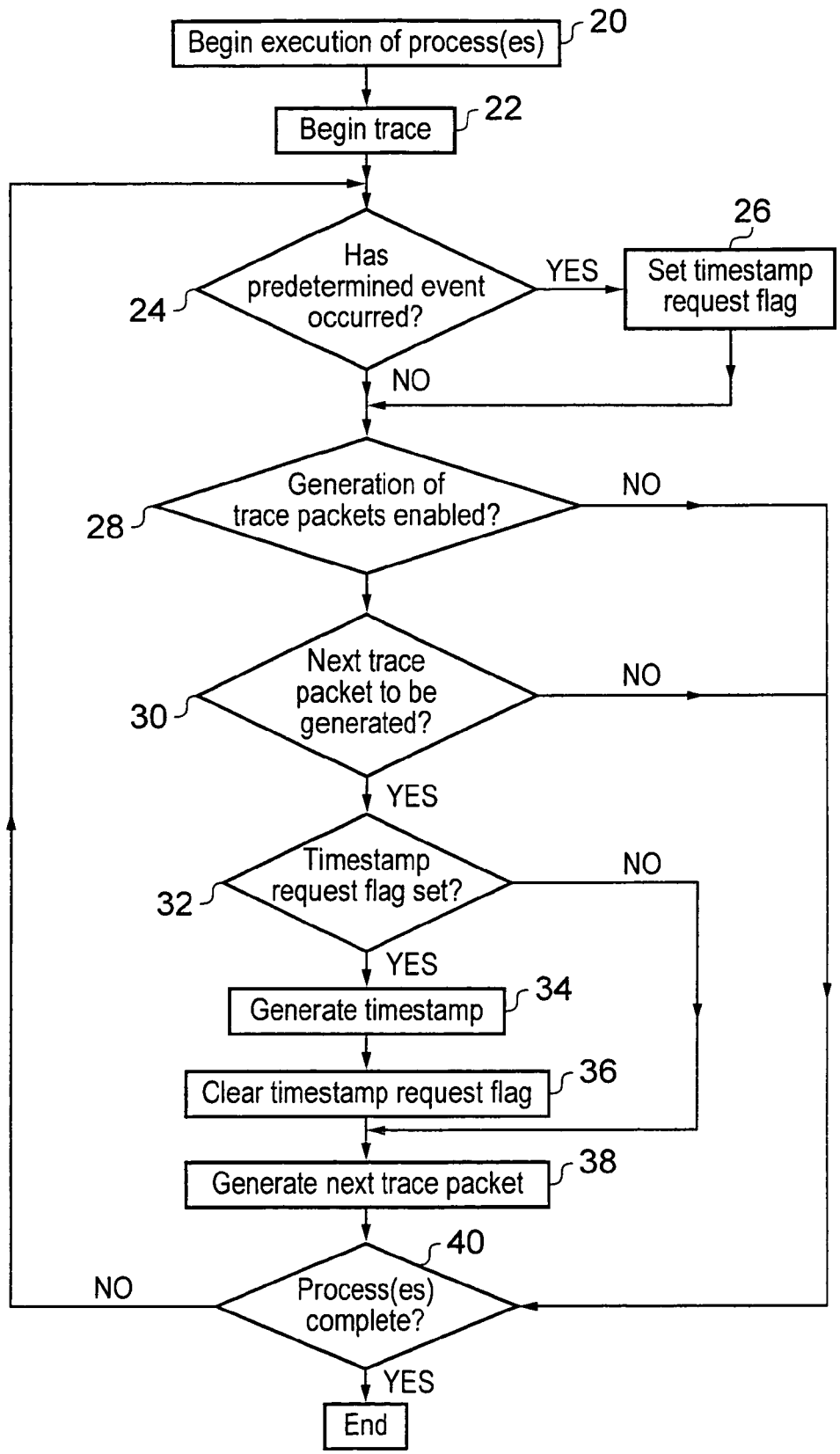
FIG. 8 shows a method in which a flag is set to indicate a pending timestamp request, independently of whether generation of trace packets is disabled.

As mentioned above, the trace module 12 may have a function for selecting whether or not trace packets are generated as a result of the tracing of the operations of the processor 4. Even if generation of trace packets is disabled, the trace module 12 may still monitor the operations of the apparatus 4. For the present technique, if a predetermined event occurs while trace generation is disabled, then a timestamp is not generated. However the timestamp request flag may still be set and retained by the system until the next time that trace is enabled, when a timestamp can be generated. In systems where the trace module 12 is disabled completely in order to disable trace generation then the processor 4 can record the occurrence of the predetermined event and provide a signal to the trace module 12 upon re-enablement of the trace generation. FIG. 8 shows a method in which, independently of whether trace packet generation is enabled or not, the timestamp request flag is set when a predetermined event occurs. If trace packet generation is re-enabled then when the next trace packet is generated and the timestamp request flag is set at that point then a timestamp is generated. By recording the occurrence of predetermined events even while generation of trace packets is disabled, this allows the tracing of a program as it is moved around a multi-processor cluster to be pieced back together more reliably. Thus, trace analysis can be made more accurate.

In FIG. 8 the steps 20-26 and 30-40 are analogous to the corresponding steps of FIG. 2. FIG. 8 differs from FIG. 2 in that prior to checking whether the next trace packet is to be generated at step 30, step 28 is performed to check whether generation of trace packets is enabled. If generation of trace packets is enabled then flow proceeds to step 30 where it is determined whether the next trace packet is to be generated. Step 26, which sets the timestamp request flag if the predetermined event has occurred, is performed regardless of whether or not trace generation is disabled. On the other hand, if at step 28 generation of trace packets is not enabled, then flow proceeds to step 40 where it is determined whether the processing is complete. If processing is not complete, then the method returns to step 24 where it is again determined whether a predetermined event has occurred.

Figure 9:
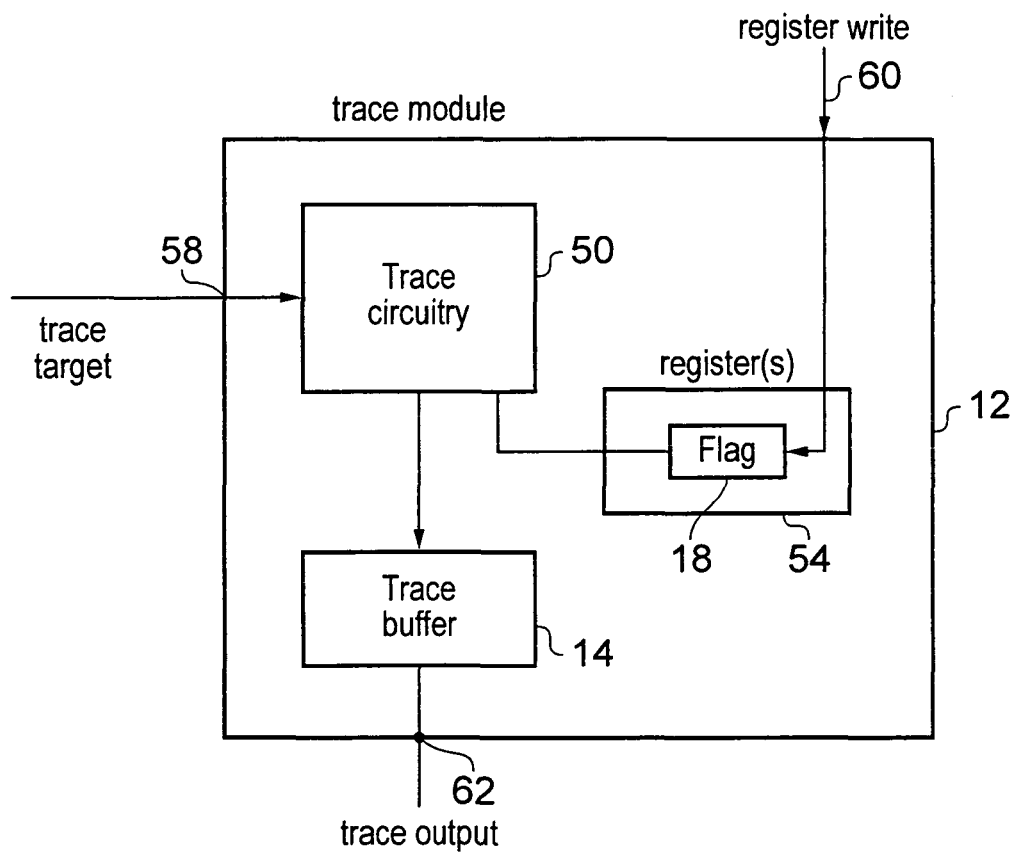
FIG. 9 schematically illustrates a trace module having a programmable register.

FIG. 9 illustrates a trace module suitable for implementing the present technique. The trace module 12 comprises trace circuitry 50, a programmable register 54 for storing the timestamp request flag 18, and, optionally, the trace buffer 14. The trace circuitry 50 monitors information received from the trace target at a trace target port 58, and generates trace data which is output to the trace buffer 14. The trace buffer 14 may be external to the trace module as illustrated in FIG. 1, or internal to the trace module 12 as illustrated in FIG. 9. The trace module has a trace output port 62 for outputting trace data to a trace analyser or other apparatus for processing the trace data.

The programmable register 54 may be written to either by the trace module 12 itself or by part of a data processing apparatus, for example a processor 4. The part of the data processing apparatus that writes to the programmable register 54 to set the flag need not necessarily be the same as the part that is being monitored by the trace module 12. The programmable register 54 may be written to by a different circuit to the target being monitored, or can be written to by the trace target itself. The programmable register 54 is written to via a register write line 60 in order to set the flag 18 to indicate a pending timestamp request. The trace circuitry 50 is then responsive to the flag 18 stored in the programmable register 54 to generate a timestamp upon generation of a next trace packet if the flag 18 indicates a pending timestamp request. Any timestamps generated are inserted into the trace stream. After generating a timestamp, the trace circuitry 50 clears the flag 18 by writing a value to the programmable register 54 to indicate that no request is pending.

In the above embodiment, the timestamp is generated together with the next trace packet generated after the occurrence of the predetermined event. In other embodiments, generation of the timestamp may if necessary be postponed until several trace packets have been generated following the predetermined event. In such embodiments, the following trace packet associated with the timestamp may be one of the next trace packet and a later trace packet other than the next trace packet.

For example, if a group of trace packets is associated with one operation/event that has already occurred, then it may be appropriate to timestamp a trace packet that corresponds to another operation/event occurring after the first operation/event. In this case, the timestamp request flag would remain set until generation of the first trace packet that indicates a different operation/event to the operation/event that triggered the timestamp request. When the first trace packet indicating a different operation/event is generated and the timestamp request flag is set, a timestamp is generated and the timestamp request flag is cleared.

Alternatively, if there is a temporary lack of trace bandwidth to accommodate a timestamp, then generation of the timestamp can be delayed until sufficient bandwidth is available. In this case, the timestamp request flag would remain set until the timestamp has been generated.

Thus, the timestamp may be generated on the next trace packet or a later trace packet depending on the current trace bandwidth or the particular operations being monitored.

The present technique of generating timestamps upon the occurrence of predetermined events may be used on its own or in conjunction with other timestamping techniques. For example, the processor 4 may be able to request the insertion of timestamps, or the operating system of the processor may have this capability. The trace module could have multiple timestamp request registers 54, one for each request source, and could combine different timestamping schemes using an OR operation so that if any one of the various sources of timestamp requests (including, the timestamp request flag 18) issues a pending request, then a timestamp is generated when the following trace packet is generated.

The present technique adds timestamps to some trace packets which under previous timestamping techniques would not have been timestamped. This means that some existing trace analyzers, which use the presence or absence of a timestamp to deduce information about the thread being traced, may not operate correctly. This problem can be addressed by adding an extra bit to the trace packet, indicating the information previously conveyed by the presence/absence of the timestamp.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing method for a data processing apparatus including processing circuitry and tracing circuitry, the method comprising the steps of:
   processing data using the processing circuitry;
   generating trace packets using the tracing circuitry, the trace packets indicative of at least one characteristic of said data processing apparatus or said processing;
   on an occurrence of a predetermined event, at least one of the processing circuitry and the tracing circuitry setting a timestamp request flag to indicate that a timestamp request is pending;
   upon generation of a following trace packet, the tracing circuitry checking whether the timestamp request flag indicates that a timestamp request is pending; and
   when the timestamp request flag indicates that a timestamp request is pending, the tracing circuitry generating a timestamp corresponding to said following trace packet and setting the timestamp request flag to indicate that no timestamp request is pending.

2. A data processing method according to claim 1, wherein said processing comprises a plurality of threads executed using a plurality of processors of said data processing apparatus, and said predetermined event includes a transfer of execution of one of said plurality of threads from one of said plurality of processors to another of said plurality of processors.

3. A data processing method according to claim 1, wherein said predetermined event includes an exception event.

4. A data processing method according to claim 1, wherein said predetermined event includes a start of execution of an exception handling thread.

5. A data processing method according to claim 1, wherein said predetermined event includes a return to said processing following execution of an exception handling thread.

6. A data processing method according to claim 1, wherein said predetermined event includes a context switch.

7. A data processing method according to claim 1, wherein said predetermined event includes a context synchronization event.

8. A data processing method according to claim 1, further comprising a step of selectively enabling or disabling generation of said trace packets; wherein:
   upon said occurrence of said at least one predetermined event, said timestamp request flag is set to indicate that a timestamp request is pending, independently of whether said generation of said trace packets is enabled or disabled; and upon generation of a following trace packet after re-enabling said generation of trace packets and when said timestamp request flag indicates that a timestamp request is pending, said timestamp is generated corresponding to said following trace packet and said timestamp request flag is set to indicate that no timestamp request is pending.

9. A data processing method according to claim 1, wherein software executed by said data processing apparatus controls said data processing apparatus upon occurrence of said predetermined event to set said timestamp request flag to indicate that a timestamp request is pending.

10. A data processing method according to claim 1, wherein said timestamp request flag is a programmable register of a trace module for generating said trace packets.

11. A data processing method according to claim 10, wherein said timestamp request flag is set to indicate that a timestamp request is pending by said data processing apparatus writing to said programmable register on occurrence of said predetermined event.

12. A data processing method according to claim 1, wherein the timestamp corresponding to the following trace packet is applied to a timestamp correlation trace packet for correlating timestamp values of a first timing scheme with timestamp values of a second timing scheme, the correlation trace packet being inserted into a trace stream upon generation of said following trace packet.

13. A data processing method according to claim 1, wherein said timestamp is a time value appended to the following trace packet.

14. A data processing method according to claim 1, wherein said at least one characteristic of said data processing apparatus or said processing includes characteristics of at least one of:
    data processed during said processing;
    data generated during said processing;
    instructions executed during said processing;
    memory addresses accessed during said processing;
    values stored in registers of said data processing apparatus; and
    the occurrence of a hardware event.

15. A data processing method according to claim 1, wherein said following trace packet is the next trace packet generated after the occurrence of said predetermined event.

16. A data processing method according to claim 1, wherein said following trace packet is one of the next trace packet generated after the occurrence of said predetermined event and a later trace packet generated after the next trace packet.

17. A data processing apparatus comprising:
    processing circuitry for processing data; and
    tracing circuitry for generating trace packets indicative of at least one characteristic of said data processing apparatus or said processing performed by said processing circuitry; wherein:
    at least one of said processing circuitry and said tracing circuitry is responsive to an occurrence of a predetermined event to set a timestamp request flag to indicate that a timestamp request is pending; and
    upon generation of a following trace packet by said tracing circuitry, said tracing circuitry is configured to check whether or not said timestamp request flag indicates that a timestamp request is pending and, when said timestamp request flag indicates that a timestamp request is pending, to generate a timestamp corresponding to said following trace packet and to set said timestamp request flag to indicate that no timestamp request is pending.

18. A data processing apparatus according to claim 17, wherein said processing comprises a plurality of threads and said processing circuitry comprises a plurality of processors for executing said plurality of threads, and said predetermined event includes a transfer of execution of one of said plurality of threads from one of said plurality of processors to another of said plurality of processors.

19. A data processing apparatus according to claim 17, wherein said predetermined event includes an exception event.

20. A data processing method according to claim 17, wherein said predetermined event includes a start of execution of an exception handling thread.

21. A data processing method according to claim 17, wherein said predetermined event includes a return to execution of said data processing following execution of an exception handling thread.

22. A data processing apparatus according to claim 17, wherein said predetermined event includes a context switch.

23. A data processing apparatus according to claim 17, wherein said predetermined event includes a context synchronization event.

24. A data processing apparatus according to claim 17, wherein:
    said tracing circuitry has logic for selectively enabling or disabling generation of said trace packets;
    upon said occurrence of said at least one predetermined event, said at least one of said processing circuitry and said tracing circuitry is configured to set said timestamp request flag to indicate that a timestamp request is pending, independently of whether said generation of said trace packets is enabled or disabled; and
    upon generation of a following trace packet after re-enabling said generation of trace packets and when said timestamp request flag indicates that a timestamp request is pending, said tracing circuitry is configured to generate said timestamp corresponding to the following trace packet and to set said timestamp request flag to indicate that no timestamp request is pending.

25. A data processing apparatus according to claim 17, wherein software executed by said processing circuitry is configured to control said processing circuitry upon occurrence of said predetermined event to set said timestamp request flag to indicate that a timestamp request is pending.

26. A data processing apparatus according to claim 17, wherein said tracing circuitry has a programmable register for storing said timestamp request flag.

27. A data processing apparatus according to claim 26, wherein said processing circuitry is configured to set said timestamp request flag to indicate that a timestamp request is pending by writing to said programmable register on said occurrence of said predetermined event.

28. A data processing apparatus according to claim 17, wherein said timestamp corresponding to the following trace packet is applied to a timestamp correlation trace packet for correlating timestamp values of a first timing scheme with timestamp values of a second timing scheme, said tracing circuitry being configured to insert said timestamp correlation trace packet into a trace stream together with said following trace packet.

29. A data processing apparatus according to claim 17, wherein said timestamp is a time value appended to the following trace packet.

30. A data processing apparatus according to claim 17, wherein said at least one characteristic of said data processing apparatus or said processing includes characteristics of at least one of:
- data processed during said processing;
- data generated during said processing;
- instructions executed during said processing;
- memory addresses accessed during said processing;
- values stored in registers of said data processing apparatus; and
- the occurrence of a hardware event.

31. A data processing apparatus according to claim 17, wherein said following trace packet is the next trace packet generated by said tracing circuitry after the occurrence of said predetermined event.

32. A data processing apparatus according to claim 17, wherein said following trace packet is one of the next trace packet generated by said tracing circuitry after the occurrence of said predetermined event and a later trace packet generated by said tracing circuitry after the next trace packet.

33. A trace module for performing tracing operations on a data processing apparatus, the trace module comprising:
- tracing circuitry for generating trace packets indicative of at least one characteristic of said data processing apparatus or processing performed by said data processing apparatus; and
- a timestamp request flag for indicating whether or not a timestamp request is pending; wherein:
- upon generation of a following trace packet by said tracing circuitry, said tracing circuitry is configured to check whether or not said timestamp request flag indicates that a timestamp request is pending and, when said timestamp request flag indicates that a timestamp request is pending, to generate a timestamp corresponding to said following trace packet and to set said timestamp request flag to indicate that no timestamp request is pending.

* * * * *